(12) United States Patent
Hugi et al.

(10) Patent No.: US 8,326,341 B2
(45) Date of Patent: Dec. 4, 2012

(54) METHOD, APPARATUS AND COMPUTER PROGRAM FOR DOWNLINK MU-MIMO POWER SETTINGS AND CONTROL

(75) Inventors: Klaus Hugi, Helsinki (FI); Timo Roman, Espoo (FI); Lars Lindh, Helsingfors (FI)

(73) Assignee: Nokia Corporation, Espoo (FI)

( * ) Notice: Subject to any disclaimer, the term of this patent is extended or adjusted under 35 U.S.C. 154(b) by 826 days.

(21) Appl. No.: 12/489,862

(22) Filed: Jun. 23, 2009

(65) Prior Publication Data
US 2009/0318183 A1 Dec. 24, 2009

Related U.S. Application Data

(60) Provisional application No. 61/132,910, filed on Jun. 23, 2008.

(51) Int. Cl.
*H04B 7/00* (2006.01)
(52) U.S. Cl. .................................. 455/522; 455/422.1
(58) Field of Classification Search .................. 455/450, 455/451, 452.1, 453, 69, 522, 13.4
See application file for complete search history.

(56) References Cited

PUBLICATIONS

"Remaining Details on Control Signaling for the MU-MIMO Transmission Mode", 3GPP TSG-RAN WG1 #53, Ericsson Discussion, Agenda Item 7.1.1, pp. 1-2, Kansas City, USA, May 5-9, 2008.

*Primary Examiner* — Tu X Nguyen
(74) *Attorney, Agent, or Firm* — Squire Sanders (US) LLP

(57) ABSTRACT

A set of J predetermined power level offsets that scale transmission power per user are stored in a local computer-readable memory. A set of N users to which are allocated overlapping downlink frequency resources are selected. From the stored set is then selected a power level offset. An indication of the selected power level offset is signaled to at least one of the N users; and the at least one of the N users are also sent a multiplexed transmission using the selected power level offset. N is an integer at least equal to two, J is an integer at least equal to two, and at least one member of the set is other than $1/n$ in which n is any positive integer less than $N_{max}$ in which $N_{max}$ is a maximum number of users that can be multiplexed together. Various embodiments include an apparatus such as a network access node, a method, and a stored computer program. Also detailed are apparatus and method and stored computer program for practicing the invention from the perspective of the user/UE.

14 Claims, 7 Drawing Sheets

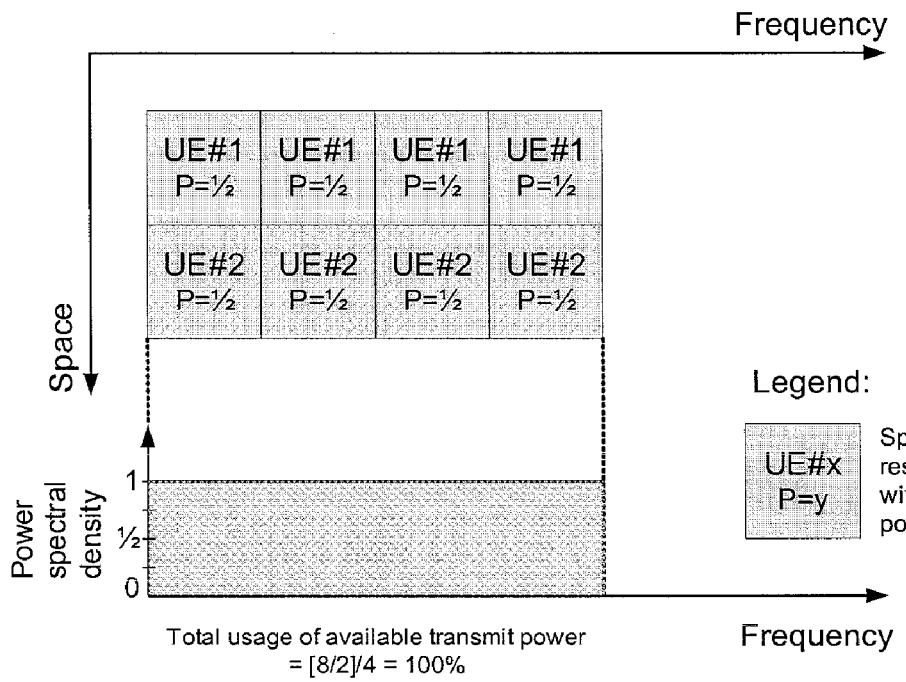
Figure 1A: Prior Art
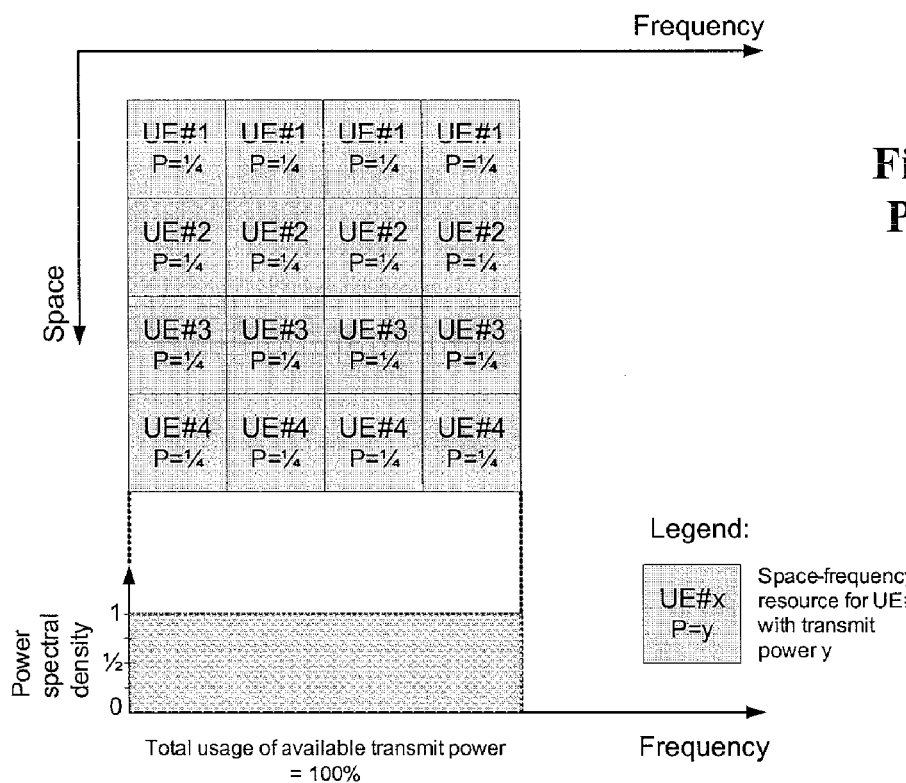
Figure 1B: Prior Art

| U1 | U1 | U1 | U1 |
| U2 | U2 |    |    |
|    | U3 | U3 |    |
|    |    | U4 | U4 |
Figure 4
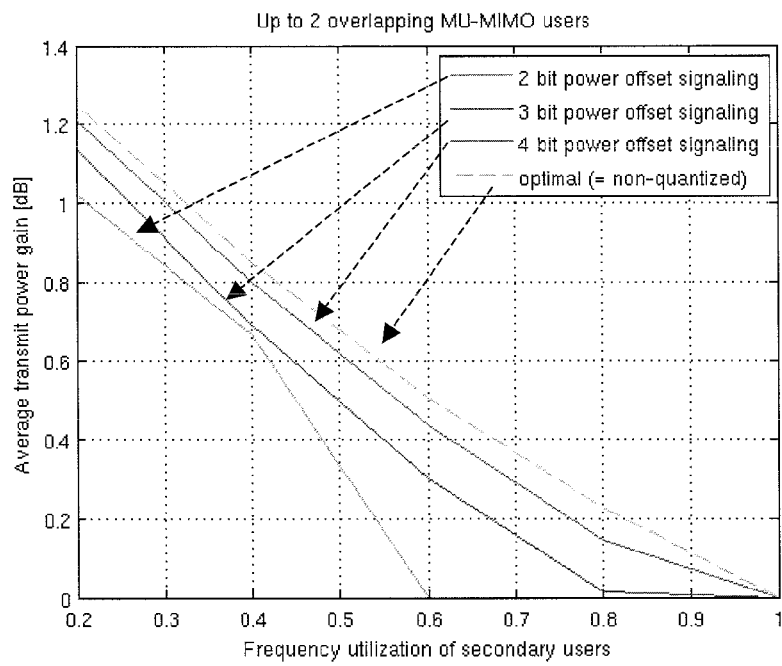
Figure 5
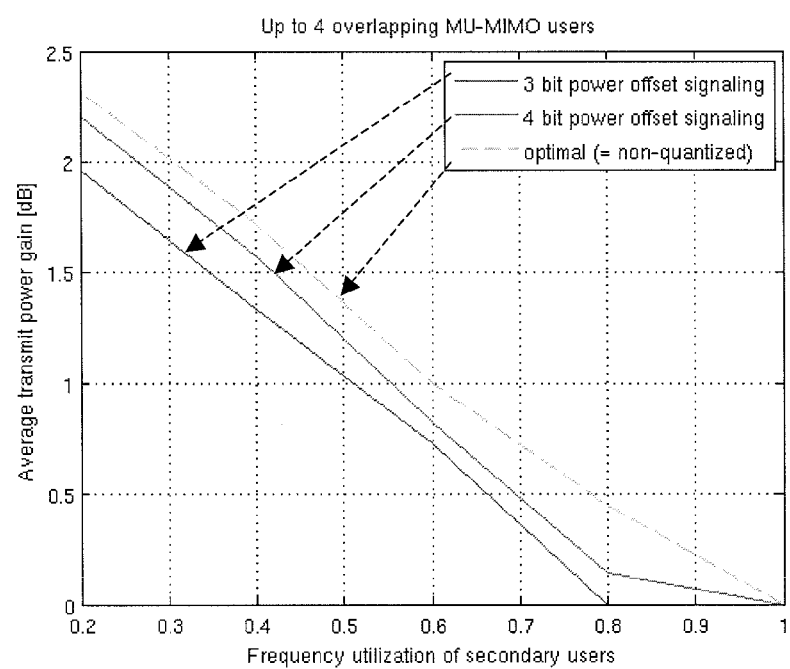
Figure 6

US 8,326,341 B2

METHOD, APPARATUS AND COMPUTER PROGRAM FOR DOWNLINK MU-MIMO POWER SETTINGS AND CONTROL

CLAIM OF PRIORITY FROM CO-PENDING PROVISIONAL PATENT APPLICATION

This patent application claims priority under 35 U.S.C. '119(e) from Provisional Patent Application No. 61/132,910, filed Jun. 23, 2008, the disclosure of which is incorporated by reference herein in its entirety.

TECHNICAL FIELD

The teachings herein relate generally to wireless networks that employ multi-user multiplexing on downlink transmissions, particularly power settings for such downlink transmissions where multiple antennas are in use. These teachings also include control signaling for such power settings.

BACKGROUND

The Third Generation Partnership Project (3GPP) is standardizing the long-term evolution (LTE, also known at evolved universal terrestrial radio access network E-UTRAN or 3.9 G) of the radio-access technology which aims to achieve reduced latency, higher user data rates, improved system capacity and coverage, and reduced cost for the operator. LTE base stations (e-NodeBs or eNBs for short) have a varying number of transmit antennas. Such eNBs employ several semi-statically configured MIMO modes in the downlink. One such semi-statically configured MIMO mode uses power control & control signaling for downlink multi-user multiple input-multiple output (MU-MIMO) transmissions, but details of how downlink DL MU-MIMO will be implemented in LTE are not yet finalized.

The MU-MIMO transmission concept allows transmissions to several users within a cell to be multiplexed spatially at a given time, i.e. these users share the same time/frequency DL resources. Proper user specific precoding at the eNB ensures an acceptable level of intra-cell inter-user interference. The purpose of such MU-MIMO transmissions is to increase the overall cell throughput (i.e. DL capacity) in scenarios with high system load. For example, in the case of MU-MIMO operation with two transmit (TX) antennas at the eNB, the DL transmissions can either spatially multiplex two users in MU-MIMO mode or transmit to a single user with rank 1 transmission. In the case of four available TX antennas at the eNB, there are the possibilities of spatially multiplexing one, two, three or four different users. Generally the different users are referred to as user equipments UEs.

Power control & its signaling to the MU-MIMO UEs plays a crucial role in order to fully achieve the system capacity gains of MU-MIMO. In LTE, it is anticipated that the number of spatially multiplexed UEs may vary from one sub-frame to another, and so the power levels need to be signaled to the MU-MIMO UEs on a per sub-frame basis as part of the downlink control indication (DCI) format on the downlink physical control channel (physical downlink control channel PDCCH in LTE). One current assumption in discussions of LTE MU-MIMO multiplexing has been that MU-MIMO UEs that are spatially multiplexed together all occupy exactly the same physical resources (in time and frequency, i.e., same sub-frame index and physical resource block PRB allocation respectively). In this situation, it is commonly understood that the total available power at the eNB is to be shared equally among the MU-MIMO UEs that are paired (i.e. spatially multiplexed) together.

Consider some examples under the above assumption. If a UE is scheduled alone on given time-frequency resources, the eNB will fully use the available transmit power on these resources to transmit to this UE. If instead there are two, three or four spatially multiplexed UEs on these resources, the eNB will share the available power between the spatially multiplexed UEs, and hence transmit to each of these UEs with ½, ⅓ and ¼ of the total available transmit power, respectively. FIG. 1A illustrates both the assumption and the resulting transmit power for the case of two multiplexed UEs. There is exact overlap of all four of the time and frequency resources (columns of FIG. 1A) between UE1 and UE2, and so when multiplexing its transmissions to these UEs, the eNB will send the transmissions for UE1 with ½ of the total available power and similarly send the transmissions for UE2 with the remaining ½ of the total available power. This follows naturally so that the eNB uses all 100% of its available transmit power over these time-frequency resources. There will be one bit necessary for control signaling of the power to the UEs in this scenario, to indicate to them whether they are to receive at ½ power or at full power (for the case where the eNB transmission is only for one of the UEs, in which case that transmission is with rank 1). FIG. 1B illustrates similarly for four multiplexed UEs. The eNB will send the transmissions for each of UE1, UE2, UE3 and UE4 with ¼ of the total available power to use all 100% of its available transmit power on the multiplexed transmission. In FIG. 1B there will be two bits necessary for control signaling of the power to the UEs, to indicate to them whether they are to receive at full, ½ or ¼ power (the remaining two-bit sequence that is available may be used to indicate ⅓ power for the case of three spatially-multiplexed UEs). This is because an individual UE generally will not know how many other UEs (if any) with which its DL traffic is being multiplexed.

The above considerations lie behind a 2-bit power offset signaling proposal in document R1-082028 (3GPP TSG-RAN WG1 #53, Kansas City, USA, May 5-9, 2008) by Ericsson, entitled "Remaining Details on Control Signaling for the MU-MIMO Transmission Mode" [attached to the priority document as Exhibit A].

This two-bit signaling for power control provides a maximum of four power levels (and one-bit control signaling provides a maximum of two power levels) as noted in the examples above. Consider the number of users being spatially multiplexed to be the integer number N. Then a general statement of the above examples is that there will be N power levels to choose from, the selected power level will be 1/N for any downlink transmission that spatially multiplexes only those N users, and the selected power level will be signaled using one bit for the case of N<3 and two bits for the case of N>2. To the inventors' knowledge, no different proposal for this power control signaling for downlink control information (DCI) format 2 (or any other DCI format) over the physical downlink control channel (PDCCH) has been made. But as will be detailed below, the above assumption leads to sub-optimal results. Limiting the power level options to two or four may be optimum for the case where the resources exactly overlap, but in practice this will typically not be the case; there will be some overlap but it generally will not be a total overlap for all of the N users. For this practical scenario, spatially multiplexing users who have only partial overlap of resources in frequency according to the proposal of document R1-082028 is sub-optimal and leads to inefficient use of transmit power at the eNB in that less than all of its available transmit power is used effectively. These teachings address that inefficient use.

SUMMARY

In a first aspect thereof the exemplary embodiments of this invention provide a method comprising: storing in a local computer-readable memory a set of J predetermined power level offsets that scale transmission power per user; selecting (e.g., by at least one processor) a set of N users to which are allocated overlapping downlink frequency resources; selecting from the set (e.g., by the at least one processor) a power level offset; signaling (e.g., via at least one transmitter) to at least one of the N users an indication of the selected power level offset; and sending (e.g., via the at least one transmitter) a multiplexed transmission to the N users in which the transmission to the at least one of the N users is sent with the selected power level offset. In the above formulation, N is an integer at least equal to two, J is an integer at least equal to two, and at least one member of the set is other than 1/n in which n is any positive integer less than $N_{max}$ in which $N_{max}$ is a maximum number of users that can be multiplexed together.

In a second aspect thereof the exemplary embodiments of this invention provide an apparatus comprising at least one processor, a memory, and at least one transmitter. The memory stores a set of J predetermined power level offsets that scale transmission power per user. The at least one processor is configured to select a set of N users to which are allocated overlapping downlink frequency resources, and to select from the stored set a power level offset. The at least one transmitter is configured to signal to at least one of the N users an indication of the selected power level offset and to send a multiplexed transmission to the N users in which the transmission to the at least one of the N users is sent with the selected power level offset. In the above formulation, N is an integer at least equal to two, J is an integer at least equal to two, and at least one member of the set is other than 1/n in which n is any positive integer less than $N_{max}$ in which $N_{max}$ is a maximum number of users that can be multiplexed together.

In a third aspect thereof the exemplary embodiments of this invention provide a method comprising: receiving (e.g., by at least one receiver) from a network an indication of a selected power level offset; based on the received indication, selecting (e.g., by at least one processor) a power level offset from a set of J predetermined power level offsets that are stored in a local memory, in which at least one member of the set is other than 1/n in which n is any positive integer less than $N_{max}$ in which $N_{max}$ is a maximum number of users that can be multiplexed together; and receiving (e.g., by the at least one receiver) downlink control signaling in each of at least one frequency resource in a spatial channel of a multiplexed transmission from the network that was sent with a power level according to the selected power level offset.

BRIEF DESCRIPTION OF THE DRAWINGS

FIG. 1A is an illustration of prior art treatment for downlink multi-user transmission with two spatially multiplexed UEs which have identical resources in frequency using 1-bit power offset signaling and transmit power to each UE is ½ of the total available power.

FIG. 1B is similar to FIG. 1A but for 4 spatially multiplexed UEs, in which 2-bit power offset signaling is used and transmit power to each UE is ½ of the total available power.

FIG. 4 is a diagram showing a different space-frequency occupation of the users than is shown at FIGS. 3A-3B.

FIG. 5 is a diagram quantifying the average gain in transmit power usage as a function of the frequency utilization of secondary users (in other words the amount of frequency resource overlap between the users) by using 2 bit/4 level to 4 bit/8 level power control as compared to using the one-bit/2 level power control signaling of Document R1-082028 if $N_{max}=2$, where downlink transmit power dynamics in the frequency domain are limited to d=3 dB.

FIG. 6 is similar to FIG. 5 but comparing against the two-bit/4 level power control signaling of Document R1-082028 if $N_{max}=4$.

DETAILED DESCRIPTION

Figure 2A:
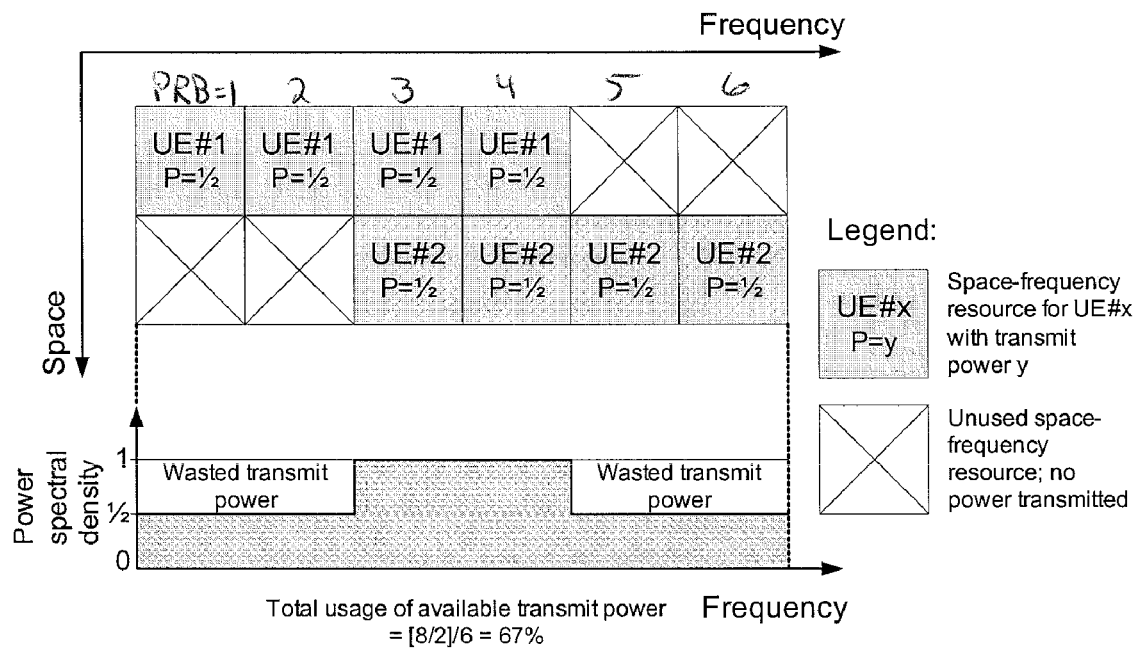
FIG. 2A is an adaptation of FIG. 1A in which the two spatially multiplexed UEs have partially overlapping resources in frequency, and illustrating that 1-bit power offset signaling and transmitting to each UE with ½ of the total available power results in less than all the available transmit power being used.

It is initially noted that the examples and explanations below are in the context of a LTE network, but embodiments of this invention are not so limited and may be employed in any network protocol, such as for example UTRAN (universal mobile telecommunications system terrestrial radio access network), GSM (global system for mobile communications), WCDMA (wideband code division multiple access, also known as 3 G or UTRAN), WLAN (wireless local area network), WiMAX (worldwide interoperability for microwave access) and the like, in which downlink transmissions are multiplexed to different users. Further, the various names used in the description below (e.g., DCI, PDCCH, PRB, etc.) are not intended to be limiting in any respect but rather serve as particularized examples directed to specific LTE implementations using current LTE terms for a clearer understanding of the invention. These terms/names may be later changed in LTE and they may be referred to by other terms/names in different network protocols, and these teachings are readily adapted and extended to such other protocols.

One assumption underlying the above discussion of prior art spatial multiplexing is that the number of spatially multiplexed users is equal to the number of available transmit antennas. It is of course possible to spatially multiplex more users than the number of available transmission antennas, which would result in a higher amount of multi-user interference. As will be seen, these teachings are not limited to the case where the maximum number of users $N_{max}$ being multiplexed is limited by the number of transmit antennas that are available for the transmission.

Recall the underlying assumption of full DL resource overlap for spatially multiplexed DL MU-MIMO transmissions leads to a maximum two-bit signaling for power control, given a maximum of four UEs whose traffic may be spatially multiplexed. This two-bit signaling scheme scales the transmitted power per UE by $\{1, \frac{1}{2}, \frac{1}{3}, \frac{1}{4}\}$ (or equivalently offsets the power per UE by $\{0, -3, -4.8, -6\}$ dB). As seen at FIGS. 1A-B, this may be optimal when all those UEs share exactly the same radio resources in time and frequency. It is seen that in practice this assumption of full frequency overlap operates as an artificial limit to utilizing all the available transmit power. To the extent that full-overlap of DL MU-MIMO resources may be considered to be a scheduling constraint on the eNB (since it is the eNB that allocates these DL resources to the MU-MIMO UEs), in practice such a constraint could serve to decrease the overall cell throughput. Such a restriction would limit how the eNB scheduler allocates its DL resources to the various UEs under its control, as it is those allocated DL resources over which the eNB sends user data/traffic to the UEs. Time-sensitive user data (e.g., time-sequenced voice packets) already constrains the eNB's scheduling flexibility as compared to time insensitive data like packets that form an Internet page. In fact, co-channel MU-MIMO UEs (co-channel being same time/frequency, not spatially the same) will have different traffic and buffer requirements as well as physical propagation parameters. This will consequently lead to different resource allocations between the co-channel UEs since the LTE eNB is flexible enough to maximize usage of its radio resources, and so only partially overlapping resource allocations on the time-frequency grid across these UEs that receive the multiplexed MU-MIMO DL transmissions is a reasonable view. Therefore the two-bit power control proposal noted in background above is optimal only when there is a full overlapping of frequency resources allocated by the eNB, and sub-optimal in the more practical scenarios of only partial overlap.

For the case of partially overlapping DL MU-MIMO frequency resources, there exist what may conveniently be considered as "holes", which are resources that are only partially occupied across the entire space-frequency grid (e.g., across the space-frequency grid, there is at least one frequency resource that is not allocated to at least one of the UEs that is to be multiplexed). It is at such holes that the prior art two-bit power control implementation results in available transmit power at the eNB being wasted. Such holes may be seen at FIGS. 2A-2B and 3A-3B as the X'd out space-frequency blocks. To address this sub-optimal result of wasted available transmit power, an embodiment of this invention uses per sub-frame power level signaling for DL MU-MIMO UEs with more power levels than the commonly assumed $N_{max}$ power levels $\{1, \frac{1}{2}, \ldots, 1/N_{max}\}$ where $N_{max}$ is the maximum number of spatially multiplexed UEs. Since in any given resource allocation less than $N_{max}$ users may be multiplexed, then the set of available power levels from the eNB selects its transmit power according to these teachings will, in an embodiment, have at least one member that is other than $1/n$, where n is any positive integer from 1 to less than $N_{max}$ (or any positive integer for that matter). This will entail more than two signaling bits for the case of four UEs, but as will be detailed below the advantage is not merely increased granularity in the set of power levels from which the eNB selects but also in more optimal usage of total available transmit power for the case where all N UEs do not fully overlap all frequency resources across the space-frequency grid.

Consider the two-UE scenario of FIG. 2A. Each column represents a physical resource block PRB, and each row represents a distinct spatial dimension that may be allocated to a user. Provided that users are well-separated in space, proper precoding of the transmission at eNB allows sending data to both users simultaneously assuming some overlap of allocated frequency resources between the users while keeping inter-user interference at low level. Because there is not full overlap of the PRBs allocated to the users, then to properly multiplex them the eNB's transmission must span the six PRBs illustrated, which the eNB will send from the transmit antennas for spatial multiplexing across the two UEs. It is convenient for this description to consider each block of space-frequency resource as a "logical resource block". There are 12 such logical resource blocks illustrated in FIG. 2A. In the prior art treatment, since there are only two UEs being multiplexed the power control signaling would be sent as a single bit, in this instance indicating $\frac{1}{2}$ of total available transmit power per UE. However, since the eNB will transmit its multiplexed DL transmission across all twelve logical resource blocks, its transmissions in the four unused logical resource blocks (illustrated by the X's) represent wasted power since the particular UE indicated will not be listening during those X'd out logical resource blocks on the space-frequency grid. There are 8 active logical resource blocks across two UEs over which transmission power is used, but only six of those blocks will be received at the UEs, and so in truth the eNB uses only $\frac{2}{3}$ or 67% of its available transmit power when the prior art approach is used for the example given at FIG. 2A. It follows that 33% of the eNBs transmit power that it used to send the multiplexed transmission is wasted. This waste is shown at the lower portion of FIG. 2A in that power spectral density PSD is less than 100% across the entire six-PRB transmission.

Figure 2B:
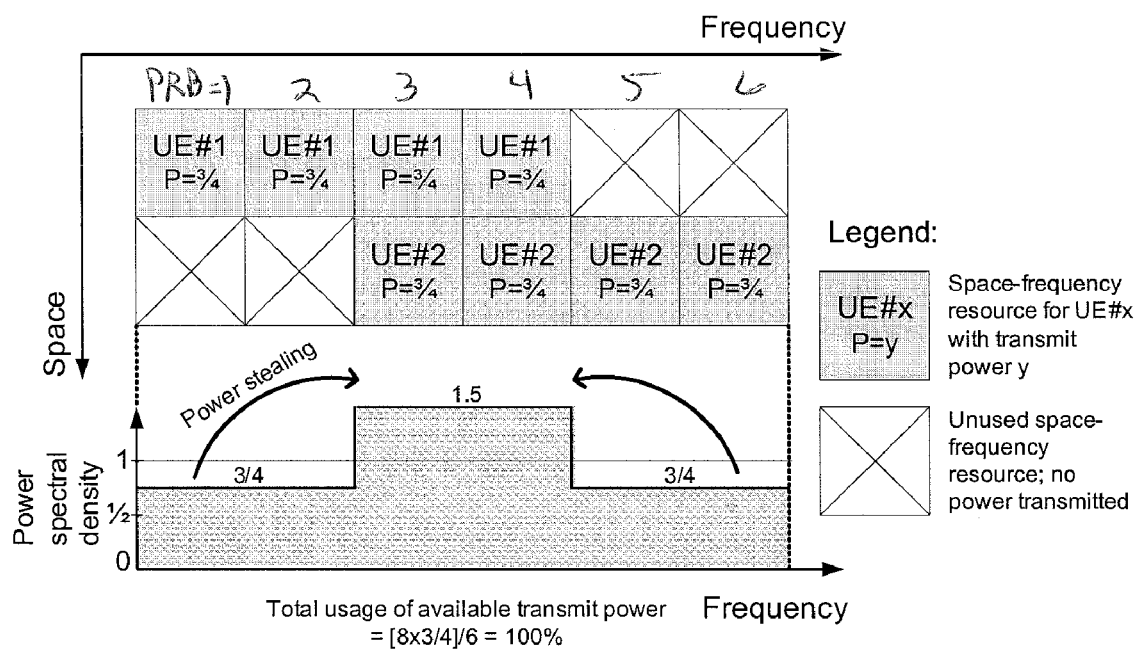
FIG. 2B shows how the partial overlap of resources at FIG. 2A can be employed to achieve an optimal power offset of ¾ transmit power per UE for the multiplexed transmission to achieve an actual 100% of total available power usage.

A conceptual view of the solution is shown at FIG. 2B, identical to FIG. 2A as to the allocation of PRBs to the UEs. The wasted power from FIG. 2A from the PRBs that are not allocated to both UEs may be instead considered at FIG. 2B to level up the transmit power of each UE over all its respective resources, provided that the total transmitted power at the eNB integrated over the totality of used frequency resources (i.e. 6 PRBs in this specific example) stays below or equal to the maximum allowed value. Counting the actual number of logical resource blocks that the UEs will monitor yields eight, just as in FIG. 2A. Since the eNB's transmission will be across six PRBs, the power value is then the solution to $(8/x)=6$. The value of x is then $\frac{3}{4}$, which is the power that the eNB uses to send from the transmit antennas its multiplexed transmission for each the two UEs.

Note that $\frac{3}{4}$ is the power the eNB uses for each logical resource block in use. Power is not increased to 100% at PRB numbers 1, 2, 5 and 6 which are allocated to only one of the two UEs, and neither is power reduced to 50% at PRB numbers 3 and 4 which are allocated to both UEs. This is because power control is per UE and sub-frame in LTE, not per PRB. More precisely, the power control for each UE is done over its allocated PRBs. The total power constraint at the eNB in LTE is per OFDM (orthogonal frequency division multiplex) symbol, and not per PRB (though power dynamics are limited to some extent). Therefore the transmitted power per PRB at the eNB may vary from one PRB to another depending on the number of MU-MIMO UEs that are spatially multiplexed on each PRB. However, the total transmitted power integrated (summed up) over all those PRBs should be kept below or equal to the maximum allowed limit (i.e. the total available transmit power). The PRBs illustrated at FIGS. 2A-2B, and also at FIGS. 3A-3B and 4, all lie within one subframe, and so there is no opportunity for the eNB to give different power control instructions to the various UEs so as to effect the 100%/50% split noted immediately above. In more generic terms, the period in which the eNB/base station/network may change only once its DL power control for MU-MIMO via signaling to the UEs may be considered as a power control interval. In LTE, the power control interval for the PDSCH power to reference symbol power is much higher than one subframe. But since the eNB may spatially multiplex different UEs from one sub-frame to another means that the eNB itself may change its power control with subframe granularity for MU-MIMO UEs.

Figure 3B:
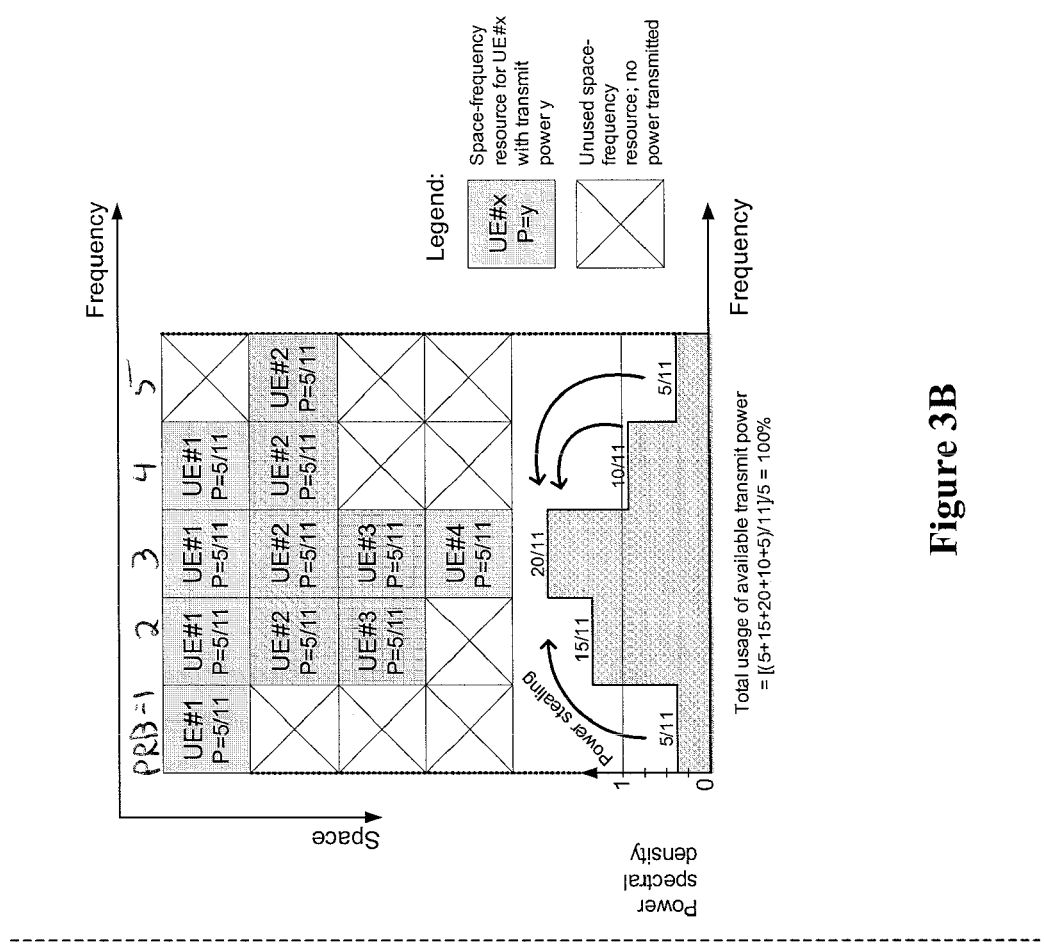
FIG. 3B is similar to FIG. 2B for the four UE scenario of FIG. 3A, showing an optimal power offset of 5/11 transmit power per UE.
Figure 3A:
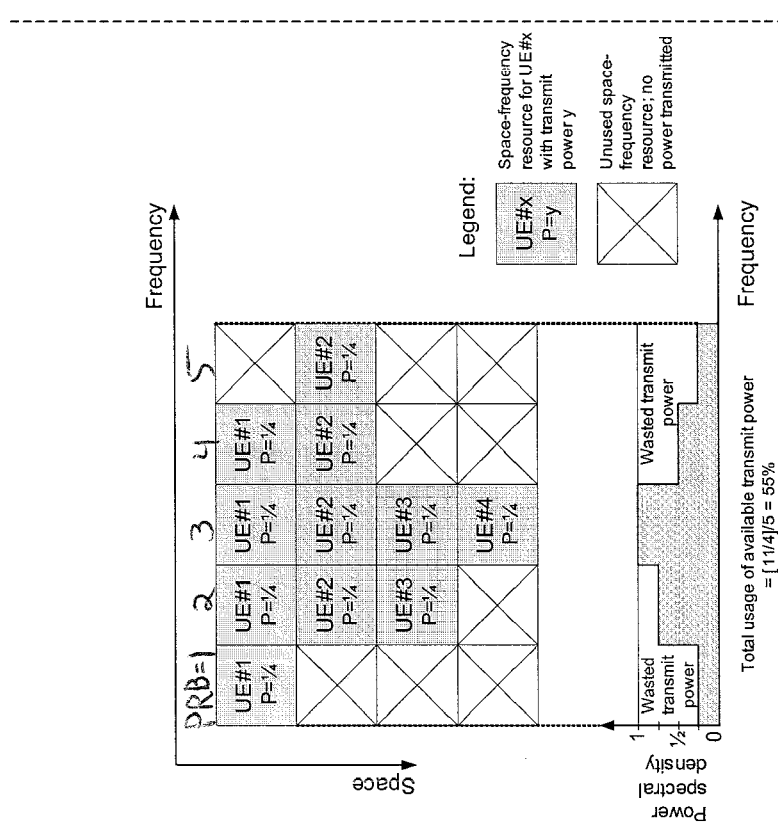
FIG. 3A is similar to FIG. 2A but for four multiplexed UEs, 2-bit power offset signaling and showing that transmitting to each UE with ¼ of the total available power results in less than all the available transmit power being used.

FIGS. 3A-3B are similar to FIGS. 2A-2B but for a four-UE scenario. There are five PRBs, of which UE1 is allocated PRB numbers 1 through 4; UE2 is allocated PRB numbers 2 though 5, UE3 is allocated PRB numbers 2 and 3; and UE4 is allocated only PB number 3. The prior art treatment finds there are four UEs, divides total power by that number, and has the eNB transmit across the transmit antennas with ¼ of the total available power for each of the UEs. The resulting wasted transmit power is shown in the PSD profile at the lower portion of FIG. 3A, and is due to spreading total transmit power over 20 logical resource blocks of which only 11 will be received at the various UEs. This represents an effective use of only 55% of the available transmit power and a waste of 45%.

At FIG. 3B, the total usage of available transmit power is kept at 100% over the five PRBs shown. The value of the PSD per PRB varies from one PRB to another, but the total used power (which is the integral of the PSD over these five PRBs) is equal to the maximum available power for transmission over these PRBs. The eNB determines that there are 11 logical resource blocks in use across the four UEs and spreads transmit power equally across the five PRBs that its transmission will span. This yields 5/11 of total transmit power per logical resource block in use, and 100% of the available transmit power is used effectively. The equation [(5+15+20+10+5)/11]=100% below the PSD diagram at FIG. 5B simply adds the 5/11 power per PRB column (for each active logical resource blocks) to prove the result. Said another way, the eNB selects a set of N users having (to which are allocated) overlapping DL frequency resources (PRBs within a subframe), determines a total number L of logical resources allocated to all of the selected N users across the subframe and a unique number U of frequency resources (in FIG. 3B, the total number L is 11 and the unique number U is 5), selects a power level based on the ratio U/L of the unique number of frequency resources to the unique number of logical resources, signals to the UEs an indication of the selected power level, and sends a multiplexed transmission to the N users across all of the unique frequency resources using the selected power level. N, L and U are of course integers. Note that for the case of quantized power levels the selected power level may not always be idealized, but the most optimum power level is selected from those in the quantized list under the constraint of not exceeding 100% available transmit power. In other embodiments where the eNB and UE are not limited to a predetermined set of quantized power levels the idealized power level is used (e.g., 5/11 as in FIG. 3B). A quantized set of predetermined power levels is preferred so that fewer bits need to be signaled to the UEs (e.g., signal only bits to indicate an index of the predetermined set). The example power allocation shown in FIG. 3B illustrates one way in which the eNB can utilize all of its available transmission power for MU-MIMO transmission. The eNB may also not choose to fully utilize the total available transmission power in order to keep the power spectral density (PSD) variations illustrated in FIG. 3B within certain limits or might even chose to use different transmission power levels for different spatially multiplexed UEs. But the selected power ratio is still determined based on the ratio of unique frequency resources U to total logical resources L (or vice versa, of course), whether or not it is also chosen in view of these or other additional considerations.

As can be seen from the above examples, the power transmitted to each MU-MIMO UE is adjusted in such a way that the total transmitted power at the eNB, integrated on the whole span of resources that are occupied by the spatially multiplexed UEs, does not exceed the maximum allowed limit. As seen at the PSD diagrams within FIGS. 2B and 3B, this means that power is stolen from parts of the spectrum where there exist "space-frequency" holes, i.e. a number of UEs that occupy (are allocated) these resources is less than the maximum number of spatially multiplexed UEs, and hence extra power is available there.

The above examples illustrate sharing the energy of possible holes in the space-frequency resource grid, between the overlapping users that are multiplexed to the same resource. This can be implemented by scaling up the transmit power of the overlapping users if the space-frequency holes exists. The number of control bits reserved for TX transmit power signaling specifies a granularity of possible power levels that can be used, and as above embodiments of this invention will employ more than the one or two power control bits proposed to LTE as noted above.

Consider another example with reference to FIG. 4. Assume that each physical (frequency) resource has one primary user, shown as UE1 which occupies the whole resource of length 6-25 PRBs (for simplicity of illustration FIG. 4 shows only four PRBs). Assume further that each resource has $0-(N_{max}-1)$ secondary users, where $N_{max}$ is the maximum number of overlapping MU-MIMO users ($N_{max}=2$ or $N_{max}=3$ or $N_{max}=4$). The actual number of the secondary users was selected randomly to generate the data underlying FIGS. 5-8. In practice, the eNB can retain flexibility as to which UEs it will multiplex in which transmissions, so as to take into account factors such as spatial separation, channel quality, signal to noise ratios, cell and user throughout requirements, and possibly other factors. Further assume that the secondary users (or at least one of them) occupy the physical resource only partially according to a utilization variable. FIG. 4 shows three secondary users UE2, UE3 and UE4, each of them only partially occupying the physical resource of the primary user UE1. A reasonable assumption is that TX power in a single PRB is allowed to increase the nominal single-user power level at most by d dB. This is reasonable in order to keep power spectral density dynamics at reasonable level. Next, assume that the set of power control levels from which the eNB may select include those of the prior art (i.e., ¼, ⅓, ½, 1 if $N_{max}=4$), so that the eNB may optimize its effective transmit power for those instance where all UEs being multiplexed occupy exactly the same PRBs and their allocation overlap is complete among all those PRBs.

For the allocation of PRBs shown at FIG. 4, where $N_{max}=4$, the physical resource consists of 4 PRBs (the primary user UE1 occupies 4 PRBs) but there are 4+3*2=10 "logical resource blocks" in use. The "optimal" power offset is U/L=4/10=0.4, which is clearly not equivalent to any possible value for 1/n if n were constrained to be a positive integer. Using the above assumption of d=3 dB (=2 in linear scale), the maximum PRB-wise TX power offset is then 3*0.4=1.2. This also is not equivalent to any 1/n value if n is an integer less than $N_{max}$. The actual TX power offset is resolved by quantizing the "optimal" offset, and there is no need to scale down the "optimal" offset as would be the case if the only power level options the eNB had to select from were {1, ½, ⅓, ¼} as in the prior art two-bit signaling of only 1/n type values, which would yield ¼ power or 3*¼=0.75.

Figure 7:
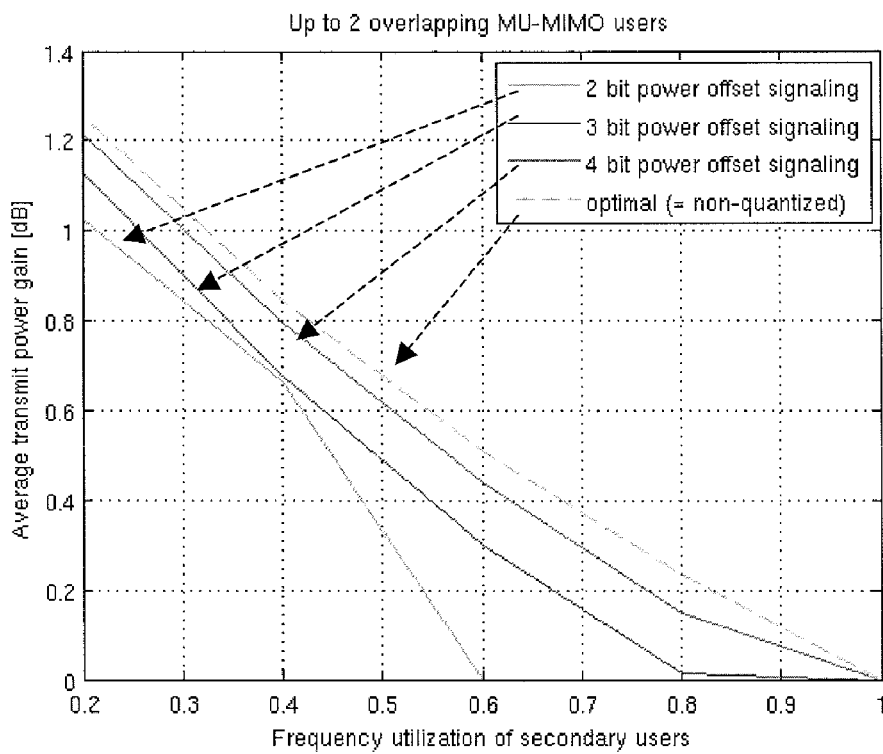
FIGS. 7-8 are similar respectively to FIGS. 5-6 but with no dynamic limitation to power spectral density PSD (i.e., d=∞).
Figure 8:
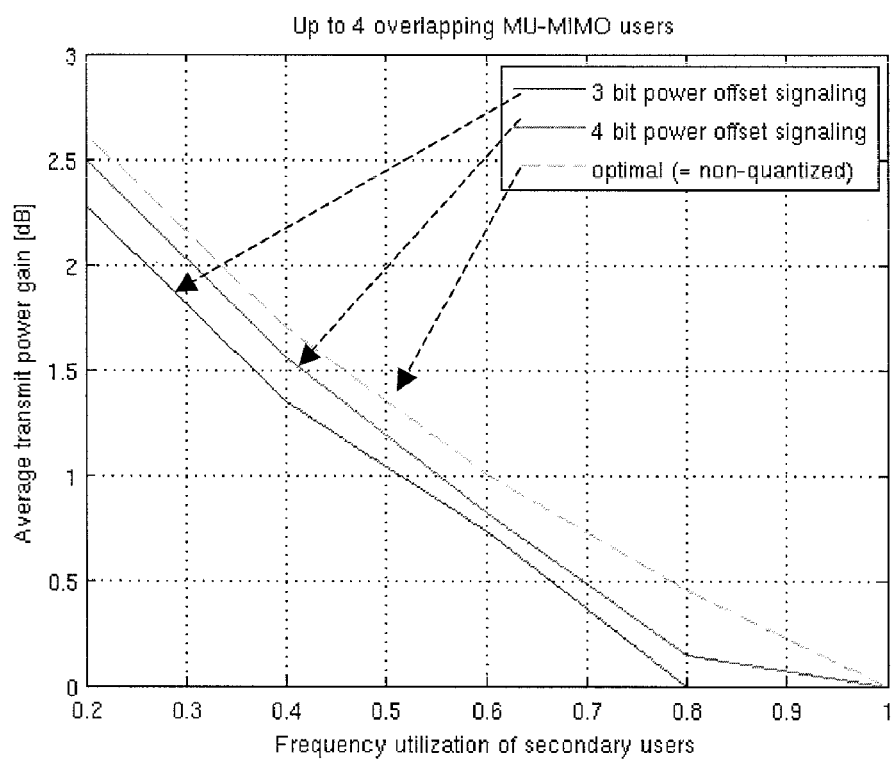

As will be understood, with high secondary user utilization the gain as compared to the prior art approach is less pronounced since the number of space-frequency holes is smaller. But with lower secondary user utilization the gains afforded by these teachings are significant as compared to the prior power control approaches. These gains are quantified by means of a statistical analysis depending on the frequency utilization of the secondary users (in other words, the amount of overlap in frequency resource allocation among users) at FIGS. 5-8, which show different sets of power levels from which the eNB can select to get closest to the optimum power level. One bit offset signaling for the case of two spatially multiplexed UEs represents the prior art set {½, 1}; two-bit offset signaling for the case of four spatially multiplexed UEs represents the prior art approach with the set {1, ½, ⅓, and ¼}; three bit offset signaling represents a set of $2^3=8$ power levels; four bit offset signaling represents a set of $2^4=16$ power levels, and optimal gives no restriction to the size of the power control signaling field. It is noted that the sets with 8 and 16 power levels (3 and 4 bit signaling) include as a subset the prior art power levels {½, 1} and {¼, ⅓, ½, 1} respectively. FIGS. 5 and 7 are for up to $N_{max}=2$ overlapping MU-MIMO UEs and FIGS. 6 and 8 are for up to $N_{max}=4$ overlapping MU-MIMO UEs. These figures show a maximum gain in transmit power utilization on the order of ~1.2 dB when 2-4 bit power level signaling is used instead of 1-bit power level signaling for 2 and (4) spatially multiplexed users respectively (and ~2.5 dB maximum gain when 3-4 bit power level signaling is used instead of 2-bit). As noted above, gains depend naturally on the amount of overlap in frequency resources among the spatially multiplexed users.

Exemplary quantization level sets for the 3-bit signaling option (eight levels) and the four-bit signaling option (sixteen levels) are shown below as power offset intervals uniformly divided to $J=2^i$ quantization levels, where i is number of bits used for offset signaling (but always including the levels ⅓ and ½ for not wasting transmit power in the special case of multiplexed UEs being allocated exactly the same frequency resources, and also for more ready implementation in LTE) and qLevels indicates the set of quantized power offset levels from which the eNB chooses and the UE selects based on the signaled index. For each of the three cases below are shown two options for $N_{max}=2$ or 4, where $N_{max}$ is the maximum number of UEs that can be spatially multiplexed together.

--- case A: J = 4, i = 2
   if $N_{max}$ = 2, qLevels = [0.5, 0.667, 0.833, 1];
   if $N_{max}$ = 4, qLevels = [0.25, ⅓, 0.5, 1].
case B: J = 8, i = 3
   if $N_{max}$ = 2, qLevels = [0.5, 0.5714, 0.6429,
     0.7143, 0.7857, 0.8571, 0.9286, 1];
   if $N_{max}$ = 4, qLevels = [0.25, ⅓, 0.4167, 0.5, 0.625, 0.75, 0.875, 1].
case C: J = 16, i = 4
   if $N_{max}$ = 2, qLevels = [0.5, 0.5333, 0.5667, 0.6, 0.6333, 0.6667,
     0.7, 0.7333, 0.7667, 0.8, 0.8333, 0.8667, 0.9, 0.9333,
     0.9667, 1];
   if $N_{max}$ = 4, qLevels = [0.25, 0.3, ⅓, 0.4, 0.45,
     0.5, 0.55, 0.6, 0.65, 0.7, 0.75, 0.8, 0.85, 0.9, 0.95, 1].

---

FIGS. 5-6 show results under the above assumption of d=0.3 dB and FIGS. 7-8 assume no restriction to power step size per PRB (d=∞). As can be seen by a comparison of FIGS. 6 and 8, the power step size restriction has an effect on the up to $N_{max}=4$ UE case, but for the up to $N_{max}=2$ user case of FIGS. 5 and 7 the lack of a power step size restriction does not have any effect because the power per PRB stays below the 3 dB limit over the nominal value.

The signaled power level values to the MU-MIMO UEs can represent power values/levels relative to the PDSCH-to-RS (reference symbol) power setting configured for each of the spatially multiplexed UEs, as part of the normal procedure for DL power control in LTE. Another option is that the signaled power level values to the MU-MIMO UEs can represent absolute power values/levels. The choice for LTE may depend on other aspects of that system so as to better harmonize.

To support the multi-user power allocation/balancing scheme described above, related multi-power levels are hereinafter defined as well as a corresponding signaling scheme to enable a simple implementation of these teachings. It is anticipated that standardizing such a signaling scheme would best keep control signaling overhead to a minimum since then both UE and eNB will understand the same meaning for a minimum number of bits needed to distinguish the different power levels. Such a set of J power levels that can be signaled to the MU-MIMO UEs is to include as a subset the power levels {1, ½, . . . , $1/N_{max}$} of document R1-082028 (referenced above), where $N_{max}$ is the maximum number of spatially multiplexed UEs. In this way, power usage remains optimum in the case when all of the spatially multiplexed UEs happen to have an identical resource allocation. The remaining $J-N_{max}$ power levels according to these teachings can be either quantized uniformly, or optimized by statistical analysis taking into account e.g. the distributions of MU-MIMO UEs resource allocation and spectral overlap. So generally there is a set of J power levels from which the eNB selects that one power level a nearest the optimum power level without exceeding 100% of total available power, the eNB signals an indication of this power level to the UEs on a per-subframe basis (e.g., the 3 or 4 or more bit indication), and multiplexes across K antennas a transmission to N UEs on each of the allocated frequency resources using the selected power level.

Signaling of these power levels is, in an embodiment specific to LTE, embedded within the UE specific downlink control indication DCI fields on the physical downlink control channel PDCCH. The DCI format for MU-MIMO is still undefined for LTE, but by recent discussions (RAN1#53 Kansas City, May 2008) it was agreed to use existing formats by reinterpreting bits therein. For the case where power levels are to be signaled, DCI format 2 (which is used for DL single user MIMO) is seen to be the only candidate which has spare room, in that modulation and coding scheme MCS, hybrid automatic repeat request HARQ, and preceding fields related to the second codeword are not needed when the UE is set in a MU-MIMO mode which assumes a rank 1 single codeword transmission. Preliminary statistical investigations summarized at FIGS. 5-8 show that 3-4 bit power level signaling for up to $N_{max}=4$ spatially multiplexed UEs achieves close-to-optimal power usage at the eNB over the whole range of frequency resource utilization (from low to high overlap of frequency resources among the spatially multiplexed UEs).

It is also noted that DCI Format 1B could be used for a maximum of two spatially multiplexed UEs. In this scenario there would be 2 options for power level signaling to UEs, given below. The first uses no power level signaling as there is no available bit as such in format 1B for this purpose. As such this is seen to be consistent with the prior art approach for format 1B. But the second option differs over the prior approach. Format 1B uses a so-called "compact" resource allocation mechanism described in LTE specifications, with 1 bit (referred to as distributed transmission flag) which triggers the use of distributed transmission. Distributed transmission is a mechanism for providing frequency diversity by modifying the real resource allocation in a specific way known in advance to both the eNB and the UE. But distributed transmission is likely not to be a needed feature for the semi-statically configured MU-MIMO mode. Hence the 1-bit distributed transmission flag could be re-used for MU-MIMO UEs to indicate the two power levels {½, 1}. To the inventors' knowledge, there have been no prior proposals to re-use this distributed transmission flag.

As detailed above, embodiments of this invention provide an efficient usage of transmit power at the eNB in the DL MU-MIMO mode. They further offer the eNB scheduler increased flexibility in that there is no unnecessary scheduler restrictions for MU-MIMO since resource allocations among the spatially multiplexed UEs need not necessarily be identical. Power utilization remains optimum in the special case when spatially multiplexed UEs are allocated exactly the same resources. There is a small increase in signaling overhead (to 3-4 bits using the analysis of FIGS. 5-8), but this is readily implemented in LTE as it is seen that the DCI format 2 can accommodate up to 12 bits of additional signaling when used for MU-MIMO signaling without adding to the size of that format.

A review of the PSD plots of FIGS. 2B and 3B shows that peaks are introduced in the power spectral density. However standard power control in LTE allows for up to 5-6 dB power dynamics among adjacent PRBs. Nevertheless, the eNB scheduler in combination with the power allocation unit (e.g., within the processor) for MU-MIMO has the ability to restrict the dynamic range, such as for example by using different power levels for different spatial multiplexed users and/or not fully utilizing the totally available transmission power.

Figure 9:
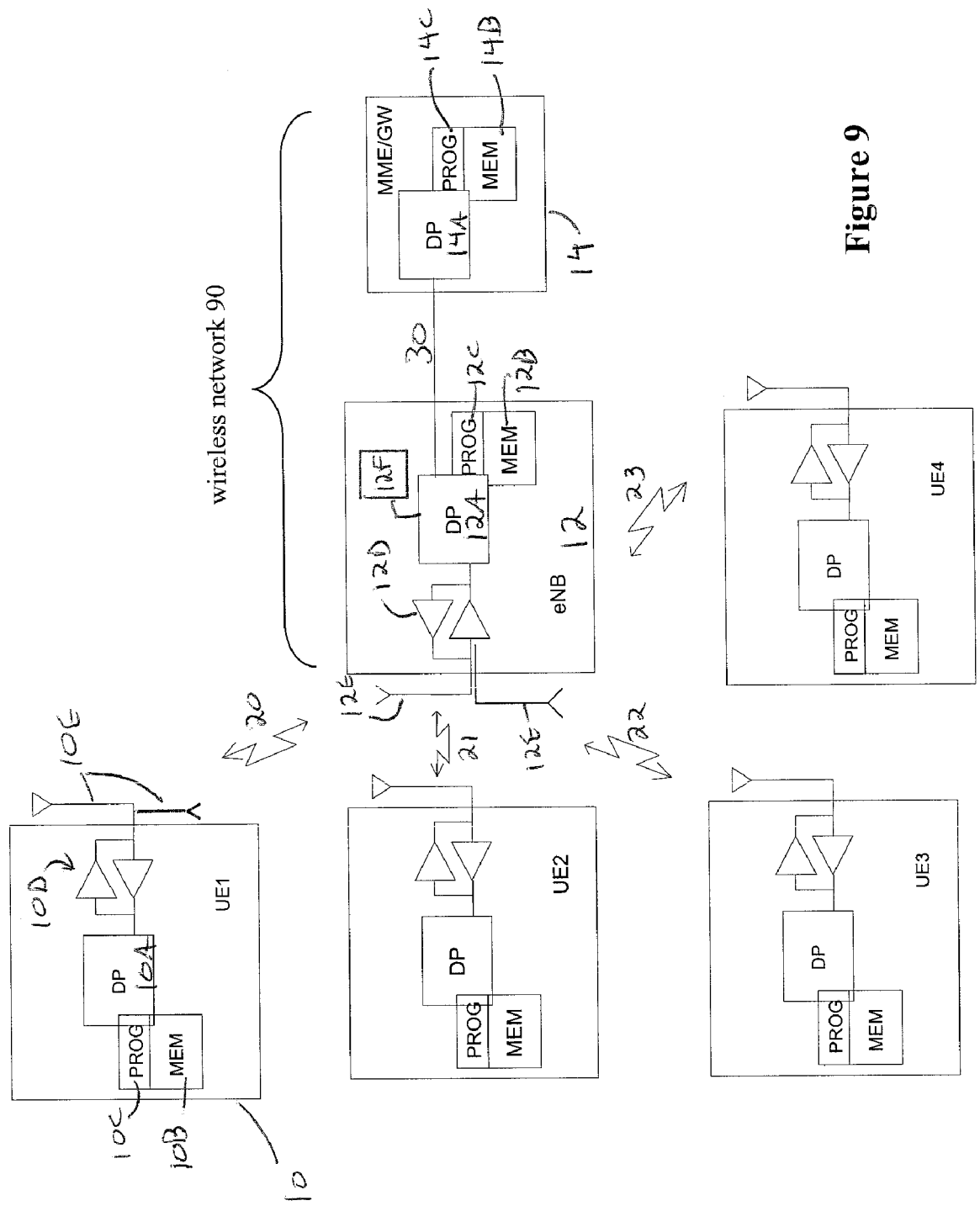
FIG. 9 shows a simplified block diagram of various electronic devices that are suitable for use in practicing the exemplary embodiments of this invention.

Reference is now made to FIG. 9 for illustrating a simplified block diagram of various electronic devices that are suitable for use in practicing the exemplary embodiments of this invention. In FIG. 9 a wireless network 90 is adapted for communication between a UE 10 and an eNB 12 (base station, Node B, access node). Four UEs (UE1, UE2, UE3 and UE4) are shown representing the two or more UEs to whom the eNB's transmissions are spatially multiplexed and though they need not be identical, only one UE is detailed with particularity herein. The network 90 may include a gateway GW/serving mobility entity MME/radio network controller RNC 14 or other radio controller function known by various terms in different wireless communication systems. The UE 10 includes a digital processor (DP) 10A, a memory (MEM) 10B that stores a program (PROG) 10C, and a suitable radio frequency (RF) transceiver 10D coupled to one or more antennas 10E (two shown for UE 10) for bidirectional wireless communications over one or more wireless links 20 with the eNB 12. The different links 20, 21, 22, and 23 to the different UEs represent different spatial channels.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The eNB 12 also includes a DP 12A, a MEM 12B, that stores a PROG 12C, and a suitable RF transceiver 12D coupled to one or more antennas 12E (two shown, four detailed in text above). The eNB 12 may be coupled via a data path 30 (e.g., Iub or S1 interface) to the serving or other GW/MME/RNC 14. The GW/MME/RNC 14 includes a DP 14A, a MEM 14B that stores a PROG 14C, and a suitable modem and/or transceiver (not shown) for communication with the eNB 12 over the Iub link 30.

Also within the eNB 12 is a scheduler 12F that schedule the various UEs under its control for the various UL and DL subframes, including the DL PRBs detailed above. Once scheduled, the eNB sends messages to the UEs with the scheduling grants (typically multiplexing grants for multiple UEs in one message). These grants are sent over the particular channels noted with the specific embodiments detailed above. Generally, the eNB 12 of an LTE system is fairly autonomous in its scheduling and need not coordinate with the GW/MME 14 excepting during handover of one of its UEs to another network node of the LTE or other system.

At least one of the PROGs 10C, 12C and 14C is assumed to include program instructions that, when executed by the associated DP, enable the electronic device to operate in accordance with the exemplary embodiments of this invention, as detailed above. Inherent in the DPs 10A, 12A, and 214A is a clock to enable synchronism among the various apparatus for transmissions and receptions within the appropriate time intervals and slots required, as the scheduling grants and the granted resources/subframes are time dependent.

The PROGs 10C, 12C, 14C may be embodied in software, firmware and/or hardware, as is appropriate. In general, the exemplary embodiments of this invention may be implemented by computer software stored in the MEM 10B and executable by the DP 10A of the UE 10 and similar for the other MEM 12B and DP 12A of the eNB 12, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Figure 10:
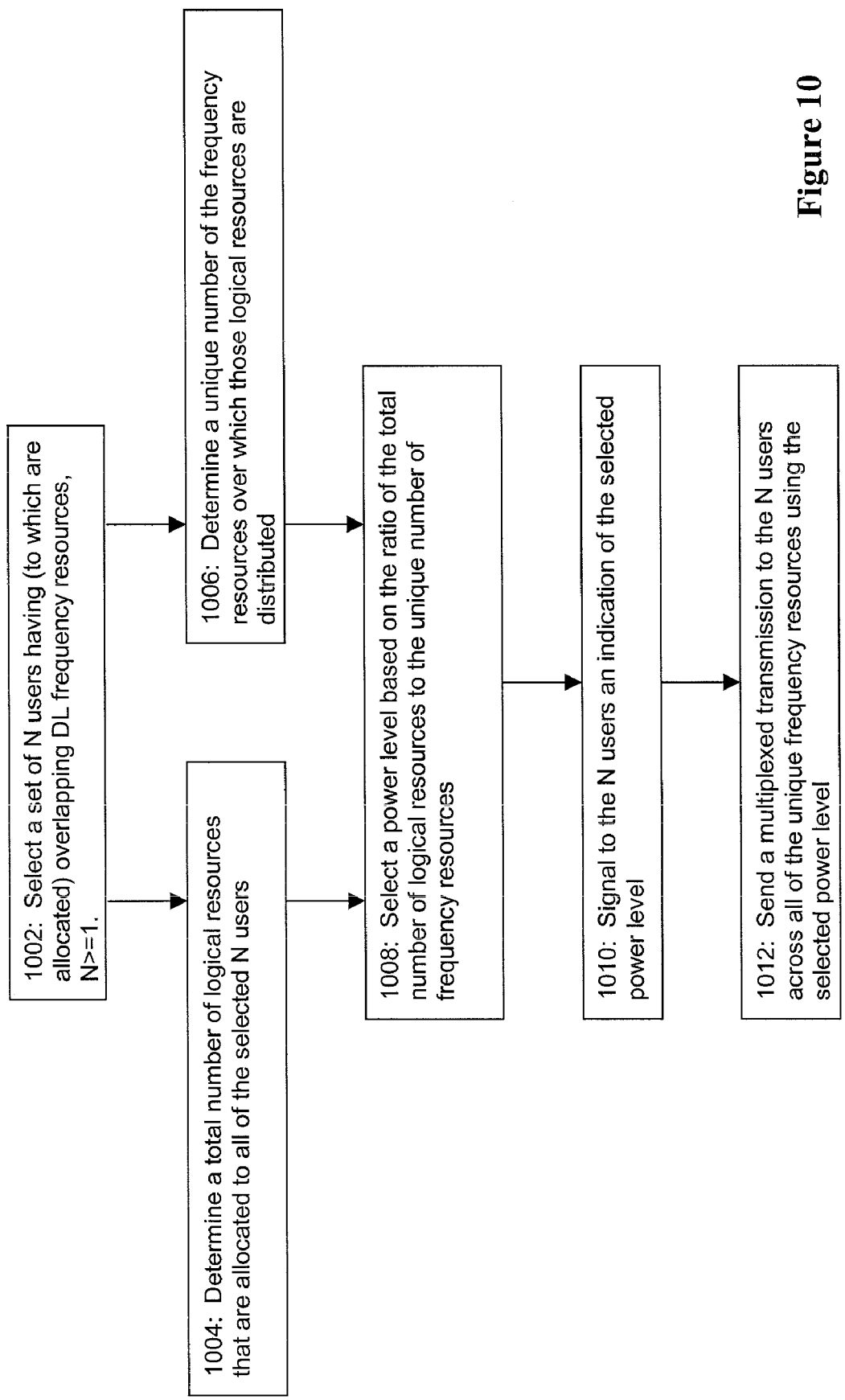
FIG. 10 is a process flow diagram according to an exemplary embodiment of the invention.

In one respect particular aspects of the invention such as those related to the eNB may be embodied as a method, an apparatus, and/or a memory embodying a computer program executable by a digital processor to perform actions directed toward power control of multiplexed transmissions. This is shown at FIG. 10. Not particularly shown at FIG. 10 but understood from the above description, prior to block 1002 there is stored in a local computer-readable memory a set of J predetermined power level offsets that scale transmission power per user. At least one member of this stored quantized set is other than 1/n in which n is any positive integer up to (but not including) $N_{max}$. The embodiment particularly shown at FIG. 10 includes selecting a set of N users having (to which are allocated) overlapping DL frequency resources (block 1002), determining a total number of logical resources that are allocated to all of the selected N users across the subframe (block 1004), determining a unique number of the frequency resources over which those logical resources are distributed (block 1006), selecting a power level based on the ratio of the total number of logical resources to the unique number of frequency resources (block 1008), signaling to the N users an indication of the selected power level (block 1010), and sending a multiplexed transmission to the N users across all of the unique frequency resources using the selected power level (block 1012). N is an integer at least equal to one. Block 1012 reflects the generalized use of the selected power level offset in common for all of the N multiplexed users, but for the per-user power control embodiment noted above the transmission to each of the N multiplexed users is instead sent with the power level offset that is selected on a per user basis. As above, the per-user power level offset indications are sent to the respective users on the user-specific PDCCH. As detailed above, selecting the power level based on the ratio of logical resources to the unique frequency resources may be from a predetermined quantized set of power levels, where the selection is under the constraint of not exceeding 100% of available transmit power (other constraints such as spatial separation etc. as noted above may also be factored in by the eNB).

In more particular embodiments, the frequency resources are allocated PRBs within a subframe; the multiplexed transmission is a MU-MIMO transmission from K transmit antennas; there are at least two of the selected N users whose DL frequency resources only partially overlap with one another; the power level selected based on the ratio is selected from a set of J predetermined power levels that are stored in a local memory such that the selected power level is nearest to 100% when accumulated over all of the multiplexed transmissions without exceeding 100%; the indication of the selected power level is a bit sequence of length i wherein $2^i=J$ and i is an integer at least equal to two, the indication is sent in a DCI format 2 and the i bits are disposed in a field defined for rank 1 transmissions as for at least one of MCS and HARQ and preceding for a second codeword; and in another embodiment i is an integer at least equal to three. In another embodiment noted above with respect to the LTE Format 1B, for the case where N=2 (only two UEs being multiplexed), signaling to the N users the indication of the selected power level includes signaling with a one-bit indication in a compact resource allocation using a distributed transmission flag (though this bit may be re-named at some later date).

In another respect particular aspects of the invention such as those related to the UE may be embodied as a method, an apparatus, and/or a memory embodying a computer program executable by a digital processor to perform actions directed toward power control of received multiplexed transmissions. Such embodiments include receiving from a network an i-length indication of a selected power level where i is an integer number of bits at least equal to three, based on the received indication selecting a power level from a set of J predetermined power levels that are stored in a local memory (where $2^i=J$), and receiving downlink signaling in each of at least one frequency resource in a spatial channel of a multiplexed transmission from the network that was sent with the selected power level. In another UE-related aspect the i-length indicator may be one or more, and for the case where the UE receives the indicator of length that indicator is in a compact resource allocation at the position of a distributed transmission flag.

Said another way, embodiments of the invention provide that the mapping between power level and number of spatially multiplexed UEs is not one-to-one as in the prior art. The predetermined set of quantized power levels from which the eNB selects and the receiving UE maps the indication is not equal to the number of UEs being multiplexed as is the case with the prior art. The power levels, whether quantized or not, are computed and signaled so as to maximize usage of the space-frequency grid, and therefore enable increased throughput per UE and enhance the total cell throughput.

For the aspects of this invention related to the eNB (or more generally to the network) side of the multiplexed transmissions), embodiments of this invention may be implemented by computer software executable by a data processor of the eNB 12, such as the processor 12A shown, or by hardware, or by a combination of software and hardware. For the aspects of this invention related to the user equipment side of the multiplexed transmissions, embodiments of this invention may be implemented by computer software executable by a data processor of the UE 10, such as the processor 10A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:

1. A method comprising:
   storing in a local computer-readable memory a set of J predetermined power level offsets that scale transmission power per user;
   selecting, by at least one processor, a set of N users to which are allocated overlapping downlink frequency resources;
   selecting from the set, by the at least one processor, a power level offset;
   signaling, via at least one transmitter, to at least one of the N users an indication of the selected power level offset; and
   sending, via the at least one transmitter, a multiplexed transmission to the N users in which the transmission to the at least one of the N users is sent with the selected power level offset;
   in which N is an integer at least equal to two, J is an integer at least equal to two, and at least one member of the set is other than 1/n in which n is any positive integer less than Nina, in which Nina, is a maximum number of users that can be multiplexed together,
   wherein there are at least two of the selected N users whose downlink frequency resources only partially overlap with one another.

2. The method according to claim 1, wherein selecting from the set the power level offset comprises:
   determining a total number L of logical resources that are allocated to all of the selected N users across a subframe;
   determining a unique number U of the frequency resources over which the total number of logical resources are distributed; and
   wherein the selecting the power level offset from the stored set is based on a ratio U/L of the unique number of frequency resources to the total number of logical resources, in which U and L are each integers greater than two;
   and wherein sending the multiplexed transmission is across all U of the unique frequency resources.

3. The method according to claim 1, in which the selected power level offset is selected to be nearest to but not exceeding 100% of maximum transmit power usage.

4. The method according to claim 1, wherein the frequency resources are allocated physical resource blocks within a subframe, and wherein the selected power level offset is signaled to all of the N users and the multiplexed transmission is sent to all of the N users with the selected power level offset.

5. The method according to claim 1, wherein sending the multiplexed transmission comprises sending a multi-user multiple input-multiple output transmission from K transmit antennas, in which K is an integer at least equal to two.

6. The method according to claim 1, where the indication of the selected power level is a bit sequence of length i wherein $T=J$; i is an integer at least equal to two; and the indication is sent in a downlink control channel.

7. The method according to claim 6, in which i is at least equal to three, and the method is executed by an access node of a wireless communications network.

8. An apparatus comprising at least one processor, a memory storing a set of J predetermined power level offsets that scale transmission power per user, and at least one transmitter,
   in which the at least one processor is configured to select a set of N users to which are allocated overlapping downlink frequency resources, and to select from the stored set a power level offset;
   and in which the at least one transmitter is configured to signal to at least one of the N users an indication of the selected power level offset and to send a multiplexed transmission to the N users in which the transmission to the at least one of the N users is sent with the selected power level offset;
   in which N is an integer at least equal to two, J is an integer at least equal to two, and at least one member of the set is other than 1/n in which n is any positive integer less than Nmax in which Nmax is a maximum number of users that can be multiplexed together,
   wherein there are at least two of the selected N users whose downlink frequency resources only partially overlap with one another.

9. The apparatus according to claim 8,
   wherein the processor is configured to select the power level offset from the stored set by: determining at the at least one processor a total number L of logical resources that are allocated to all of the selected N users across a subframe;
   determining at the at least one processor a unique number U of the frequency resources over which the total number of logical resources are distributed; and
   selecting from the set the power level based on a ratio U/L of the unique number of frequency resources to the total number of logical resources, in which U and L are each integers greater than two;
   and wherein the at least one transmitter is configured to send the multiplexed transmission across all U of the unique frequency resources.

10. The apparatus according to claim 8, in which the at least one processor is configured to select the power level by selecting from the set a power level offset that is nearest to but not exceeding 100% of maximum transmit power usage.

11. The apparatus according to claim 8, wherein the frequency resources are allocated physical resource blocks within a subframe and wherein the transmitter is configured to signal the selected power level offset to all of the N users and the multiplexed transmission is sent to all of the N users with the selected power level offset.

12. The apparatus according to claim 8, further comprising at least K transmit antennas, in which the at least one transmitter is configured to send the multiplexed transmission as a multi-user multiple input-multiple output transmission from K of the transmit antennas, in which K is an integer at least equal to two.

13. The apparatus according to claim 8, where the indication of the selected power level is a bit sequence of length i wherein $2^i$, J and i is an integer at least equal to two; and where the at least one transmitter is configured to send the indication in a downlink control channel.

14. The apparatus according to claim 13, in which i is at least equal to three, and the apparatus comprises an access node of a wireless communications network.

* * * * *

UNITED STATES PATENT AND TRADEMARK OFFICE
CERTIFICATE OF CORRECTION

PATENT NO. : 8,326,341 B2
APPLICATION NO. : 12/489862
DATED : December 4, 2012
INVENTOR(S) : Klaus Hugl et al.

Page 1 of 1

It is certified that error appears in the above-identified patent and that said Letters Patent is hereby corrected as shown below:

On the Front Page of the Patent

(75) Inventors, first named inventor should read

-- Klaus HUGL --.

Signed and Sealed this
Twelfth Day of February, 2013

Teresa Stanek Rea
*Acting Director of the United States Patent and Trademark Office*